(12) United States Patent
Arvag

(10) Patent No.: US 11,305,702 B2
(45) Date of Patent: Apr. 19, 2022

(54) ATTACHMENT DEVICE

(71) Applicant: Iver Arvag, Ostersund (SE)

(72) Inventor: Iver Arvag, Ostersund (SE)

( * ) Notice: Subject to any disclaimer, the term of this patent is extended or adjusted under 35 U.S.C. 154(b) by 0 days.

(21) Appl. No.: 16/809,875

(22) Filed: Mar. 5, 2020

(65) Prior Publication Data

US 2020/0384928 A1 Dec. 10, 2020

Related U.S. Application Data

(63) Continuation-in-part of application No. 16/432,117, filed on Jun. 5, 2019.

(51) Int. Cl.
*B60R 11/00* (2006.01)

(52) U.S. Cl.
CPC .................................. *B60R 11/00* (2013.01)

(58) Field of Classification Search
CPC .......... B60D 1/485; B60D 1/488; B60D 1/52; B60D 1/48; B60D 1/01; B60D 1/07; B60D 1/075; B60D 1/14; B60D 1/145; B60D 1/565; B60R 11/00; B60R 11/0049; B60R 2011/0049; B60R 2011/0052; B60R 2011/005; B60P 3/12; E01H 5/06; E01H 5/061–063; E01C 23/16; B66C 2700/0378; B66C 23/36
USPC ....................... 280/495–496, 491.5; 224/545
See application file for complete search history.

(56) References Cited

U.S. PATENT DOCUMENTS

| | | | |
|---|---|---|---|
| 2,365,372 A | 12/1944 | Allen | |
| 4,834,601 A | 5/1989 | Schaap | |
| 5,102,156 A * | 4/1992 | Fink | B60D 1/485 |
| | | | 280/495 |
| 5,683,215 A | 11/1997 | Gaignard et al. | |
| 5,924,208 A | 7/1999 | Saeki | |
| 8,540,198 B2 | 9/2013 | Keyvanloo | |
| 9,151,352 B2 | 10/2015 | Mayr et al. | |
| 9,579,941 B2 * | 2/2017 | Arvag | B60D 1/07 |
| 9,738,126 B2 * | 8/2017 | Mantovani | B60D 1/485 |
| 9,914,332 B2 * | 3/2018 | Jordan | B60D 1/565 |
| 2010/0284760 A1 | 11/2010 | Rotolo et al. | |
| 2013/0056959 A1 * | 3/2013 | Mathes | B62D 21/152 |
| | | | 280/504 |
| 2015/0352914 A1 * | 12/2015 | Arvag | B60D 1/565 |
| | | | 280/495 |
| 2016/0311281 A1 * | 10/2016 | Mantovani | B60D 1/065 |
| 2020/0224690 A1 | 7/2020 | Voss | |

OTHER PUBLICATIONS

Office Action for U.S. Appl. No. 16/432,117 dated Mar. 25, 2021.
U.S. Notice of Allowance dated Feb. 17, 2022 for corresponding U.S. Appl. No. 16/432,117.

\* cited by examiner

*Primary Examiner* — Ingrid M Weinhold
(74) *Attorney, Agent, or Firm* — Harness, Dickey & Pierce, P.L.C.

(57) ABSTRACT

An attachment system for attaching an external component to a chassis of a vehicle, such as components for performing snow clearance, road measurements, road surface marking assemblies, transport of vehicles or gear, including salvaging work and transport of heavy-duty vehicles is disclosed. The attachment system includes a connection element for interconnecting with the external component, a cross-bar fastening element for fastening a cross-bar to the attachment device, and a cross-bar support element arranged to support the cross-bar when fixated to the attachment device.

16 Claims, 5 Drawing Sheets

ATTACHMENT DEVICE

CROSS-REFERENCE TO RELATED APPLICATIONS

This application is a Continuation-in-Part of and claims priority under 35 U.S.C. § 120/121 to U.S. application Ser. No. 16/432,117 filed Jun. 5, 2019, the entire contents of each of which are hereby incorporated by reference.

FIELD OF THE INVENTION

The present invention generally relates to an attachment system for attaching an external component to a chassis of a vehicle.

BACKGROUND OF THE INVENTION

Various attachment systems for attaching external components to vehicles for e.g. salvaging operations, transport of the vehicle or of gear, snow clearance, road measurements, road surface marking assemblies and such are known. As an example, a salvaging device for a traditional heavy-duty truck is secured to a front chassis frame of the truck and may consists of a lifting belt or elevating chain secured to an attachment system consisting of a couple of tow rings which are engaged by means of a respective screw joint formed with receiving connection means in the front chassis frame. The tow rings typically project through a bumper of the vehicle, to provide points of attachments for the salvaging device, which accordingly interconnect the two tow rings. An interconnecting linkage may be arranged at a mid-section of the lifting belt in order to provide a terminal post for a hook, which is suspended from a lifting device or a towing device, for salvaging, lifting or towing of the truck. Salvaging of heavy-duty vehicles puts stiff demand on the used towing gear and mode of procedure during the salvaging operation, as incorrect salvaging can cause an even greater damage on the vehicle as compared to any damage present initial to the salvaging operation. For extremely heavy vehicles, so called heavy-duty wrecker trucks are used for salvaging operations. Wrecker trucks are equipped with lifting jacks with a capacity of over 30 tons. In addition, these trucks are often equipped with a lifting beam for towing/hauling wrecked or defect vehicles to a garage or to a scrap yard, where the lifting beam has a capacity of over 20 tons. This kind of equipment allows the wrecker truck to perform salvaging operations on both busses and transport lorries. The salvaging operation comprises performing lifting and/or hauling/towing operations on the vehicle. The salvaging operations are many times performed while applying highly asymmetrical forces on the connection means, i.e. the attachment system, of the vehicle being salvaged, and consequently on the chassis frame of the vehicle being salvaged.

DISCLOSURE OF INVENTION

One object of the invention is to provide an improved attachment system comprising an attachment device which is arranged to in a simple and safe manner be mountable to a vehicle chassis and to attach to an external component of a vehicle, and which attachment system and attachment device are configured to minimize, and be resistant, to turning or torsional forces caused by distributed asymmetric forces acting on the chassis of the vehicle during salvaging operations (or other work with external components, like e.g. snow clearance equipment) and thereby to decrease the risk of damaging the chassis frame of the vehicle during the performed work. This object is achieved by the attachment device and system according to the attached claims.

In accordance with a first aspect of the invention, an attachment device for attaching an external component to a chassis of a vehicle is disclosed. The attachment device includes a connection element for interconnecting with the external component, a chassis fixation element for fixating the attachment device to the chassis, a cross-bar fastening element for fastening a cross-bar to the attachment device, and a cross-bar support element arranged to support the cross-bar when fixated to the attachment device. That is, the support element is designed to support a cross-bar when connected to the attachment device. Typically, such cross-bar is attached to, and interconnecting, a pair of attachment devices which will be illustrated herein.

The cross-bar support element may include an opening which is arranged to receive at least a portion of the cross-bar to provide further support to the cross-bar. At least a portion of the opening is shaped to provide a clearance fit for at least a predetermined portion the cross-bar, and the opening may be semi-open, e.g. forming a recess for receiving a portion of the cross-bar along the length of the cross-bar. The opening is preferably arranged such that it is accessible from substantially a front direction, i.e. in a direction perpendicular with respect to the chassis plane when the attachment device is mounted to the chassis. Alternatively, the opening is accessible e.g. from above or some other preferred direction. Further, the opening has an inner profile that matches a corresponding outline of the portion of the cross-bar to be received in the opening.

The cross-bar support element may be positioned with respect to the cross-bar fastening element such that if the cross-bar is attached at first position(s), e.g. at its respective end portion(s), the support element is positioned a predetermined distance along the long extension of the cross-bar, forming a fulcrum for forces acting e.g. perpendicularly on the cross-bar. The cross-bar support element is thus distanced a predetermined distance from the cross-bar fastening element. The cross-bar support element is in an embodiment further positioned off-center from, or eccentrically positioned with respect to, the chassis fixation element.

The opening of the support element is preferably selected to provide support in several directions, e.g. forces in the vertical direction with respect to the (horizontally) elongated cross-bar.

According to an embodiment, the connection element for attaching to the external element and the cross-bar fastening element are arranged in the same mechanism or are integrated.

The attachment device is further arranged for connecting to/or includes a chassis coupler element having a fastening mechanism for fastening a first end portion of the chassis coupler element to the chassis of the vehicle when in a mounted position. The chassis coupler is typically arranged perpendicularly with respect to the chassis, e.g. by its first end portion being received in a mounting opening in the chassis and fixated by means of a threaded portion or by a sprint connection of the like. The opposite, second end portion of the chassis coupler element is connected to e.g. a support plate of the attachment device. The connection element to which the external component is attached to the attachment device, is in a preferred embodiment eccentrically positioned with respect to the long axis of the chassis coupler element (or to the chassis fixation element). Alternatively, when the connection element is not eccentrically arranged, it is arranged at the second end portion of the chassis coupler element and may for instance be attached to the end thereof (or positioned at the chassis fixation element).

A number of different chassis coupler elements are applicable for the attachment device, e.g. chassis coupler elements with a threaded portion for providing a screwed connection to the chassis. Another type of chassis coupler element contains an elongated coupler element which is received through a mounting hole on the chassis and locked with a retaining pin and an anchor opening of the chassis coupler element. At least a portion of the first end portion of the attachment device is shaped to fit in a corresponding mounting opening, preferably in a clearance fit, of the chassis (or beam on the vehicle) to form a rigid connection.

According to yet another embodiment of the attachment device, it includes a chassis coupler element having a cross-section perpendicular to the long axis of the chassis coupler element of at least a portion of the first or second end portion of the chassis coupler element which is selected to prevent rotation of the chassis coupler element about the long axis of the chassis coupler element when mounted to the chassis, e.g. when being received in or through an opening in the chassis with corresponding shape.

The chassis coupler element may further be arranged with a clamping device as will be explained below, for which case it is also advantageous to have a chassis coupler element with a cross-section perpendicular to the long axis at least a portion of the chassis coupler element to have a shape which is prevented from rotation of the chassis coupler element about the long axis of the chassis coupler element when mounted to the chassis in a corresponding opening and/or when a receiving opening of the clamping element is shaped in a corresponding shape fitting that cross-sectional shape of the coupler element. In yet another embodiment, the fastening of the chassis coupler element to the chassis includes a key portion arranged on the first end portion.

According to a second aspect of the invention, it discloses an attachment system for attaching an external component to a chassis of a vehicle including at least two attachment devices as described herein. Preferably a pair (or optionally more attachment devices) provides a plural of fixation points to the chassis and to the external element which is advantageous with respect to stability and distribution of any external forces acting on the chassis and the external element, e.g. when salvaging the vehicle. Typically, the two or more attachment devices are mounted distanced a predetermined distance, e.g. to match the length of a cross-bar for interconnecting the attachment devices, along a horizontal plane with respect to the chassis.

The attachment system according to an embodiment of the invention further includes a horizontally elongated cross-bar which is arranged for interconnecting a pair of attachment devices (or at least two attachment devices) as described above. The cross-bar may be detachably arranged on the attachment devices which is advantageous when mounting the attachment system to the chassis.

According to an embodiment of the attachment system, when having cross-bar supports of at least two of the respective attachment devices which have respective cross-bar support elements which are distanced from the cross-bar fastening element along the long axis of the cross-bar, the individual attachment devices are arranged to have mirror-inverted cross-bar support elements such that in a mounted position, the cross-bar support elements face each other or alternatively points away from each other with respect to the long axis of the cross-bar, thereby providing the supporting fulcrum points in between, or alternatively on the respective outer side of, the attachments points of the crossbar.

According to an embodiment of the attachment device it further comprises a clamping mechanism. The clamping mechanism includes a distance element arranged on a side of the attachment device which faces the chassis when mounted. An opposite second end portion of the chassis coupler element is shaped to fit, i.e. be received, inside a hollow space of the distance element, preferably in a clearance fit. The clamping mechanism is arranged to (optionally releasably) engage the second end portion of the chassis coupler element and to be operable to control an insertion length of the second end portion into the hollow space thereby controlling the clamping of the distance element and the chassis when the attachment device is in a mounted position.

According to an embodiment of the attachment system, a cross-section of at least a portion of the second end portion and a corresponding cross-section of the hollow space of the distance element are selected to prevent mutual rotation of the chassis coupler element and the distance element about the long axis of the chassis coupler element.

According to an embodiment of the attachment system, at least a portion of the first end portion of the attachment device is shaped to fit in or through a corresponding mounting opening of the chassis, and wherein the cross-sections of the portion of the first end portion and the corresponding mounting opening are selected to prevent rotation of the chassis coupler element about the long axis of the chassis coupler element.

According to an embodiment of the attachment system, the clamping mechanism is arranged by means of a screw joint, a bolt joint, or a stud joint arranged for engaging with the chassis coupler element via the distance element.

According to an embodiment of the attachment system, the first end portion has a cross-section shape that contains or misses at least one portion that separates the cross-section shape from a circle, i.e. that excludes a circular shape, such that the first end portion is prevented from rotating about its long axis when inserted inside a correspondingly shaped mounting opening of the chassis. The cross-section shape may for instance be selected as a regular or irregular polygon, e.g. one of a rectangle, square, ellipse, a sector of a circle, diamond, rhombic, triangle, polygon, star, t-shape etc. such that the coupler element cannot rotate about its long axis inside the mounting opening. As appreciated by a person skilled in the art other shapes of the cross-section, excluded from a circular shape, are applicable.

According to an embodiment of the attachment system, the second end portion has a cross-section shape that contains at least one portion that separates the cross-section shape from a circle, i.e. that excludes a circle shape, such that the first end portion is prevented from rotating about its long axis when inserted inside the correspondingly shaped hollow distance element. The cross-section shape may for instance be selected as a regular or irregular polygon, e.g. one of a rectangle, square, ellipse, a sector of a circle, diamond, rhombic, triangle, polygon, star, t-shape etc. such that the coupler element cannot rotate about its long axis inside the mounting opening. As appreciated by a person skilled in the art other shapes of the cross-section, excluded from a circular shape, are applicable.

According to an embodiment of the attachment system, the fastening mechanism comprises a key portion, e.g. T-, L-F, E shaped, arranged on the first end portion. The mounting opening of the chassis/beam is then preferably arranged having a corresponding complementary key hole to hold the first end portion stationary, and preferably with a predetermined angular position, with respect to the chassis/beam.

BRIEF DESCRIPTION OF THE DRAWINGS

This and other aspects of the present invention will now be described in more detail, with reference to the appended drawings showing non-limiting embodiment(s) of the invention. Corresponding components in the embodiments have the same reference number.

FIG. 4b is partly cut open.

FIG. 5b shows perspective side views of cut open illustrations of the same various different chassis coupler elements and collar shaped portions according to the present inventive concept as shown in FIG. 5a.

DETAILED DESCRIPTION

The present invention is exemplified herein under with embodiments of an attachment system for attaching an external component to a chassis of a heavy-duty vehicle. The term salvaging means should be understood as equipment for salvaging/pulling up vehicles from ditches or from being stuck in mud or snow, and for transporting damaged/defect vehicles to a garage. It is understood however that the attachment system according to the present invention is applicable for securing other types of external components such as a snow plough, support element for a crane, a measuring gear, and a road surface marking assembly etc.

Figure 1:
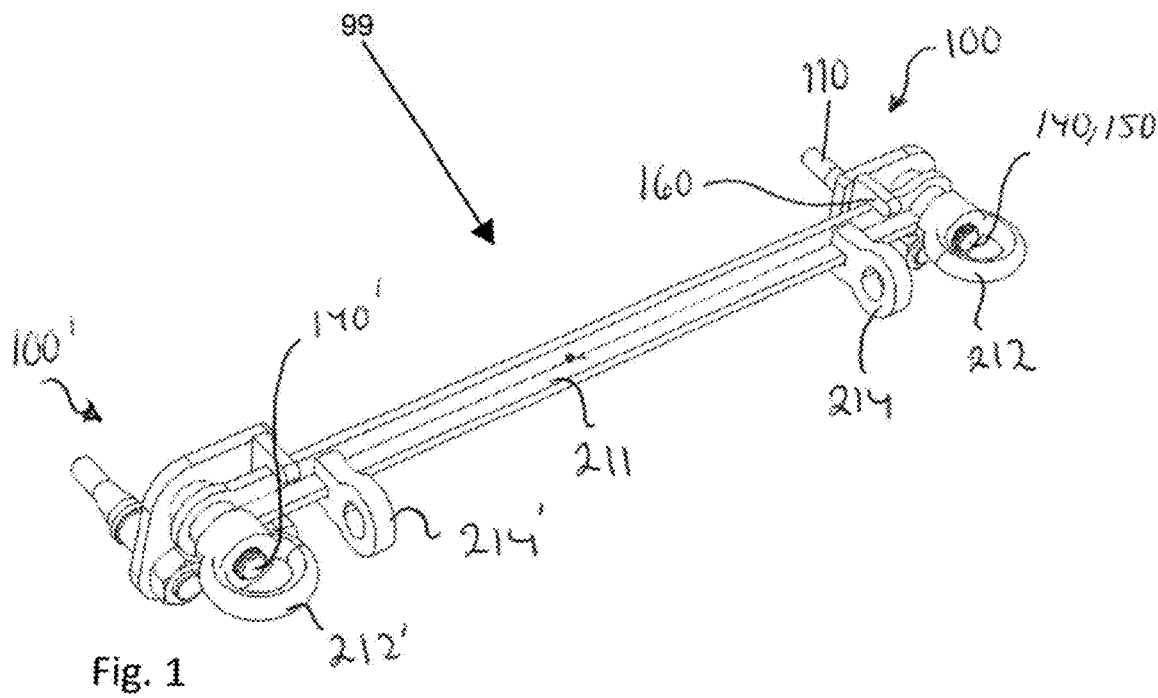
FIG. 1 is a schematic perspective view of an exemplifying embodiment of an attachment system including two attachment devices which are interconnected by a cross-bar according to the present invention.
Figure 6:
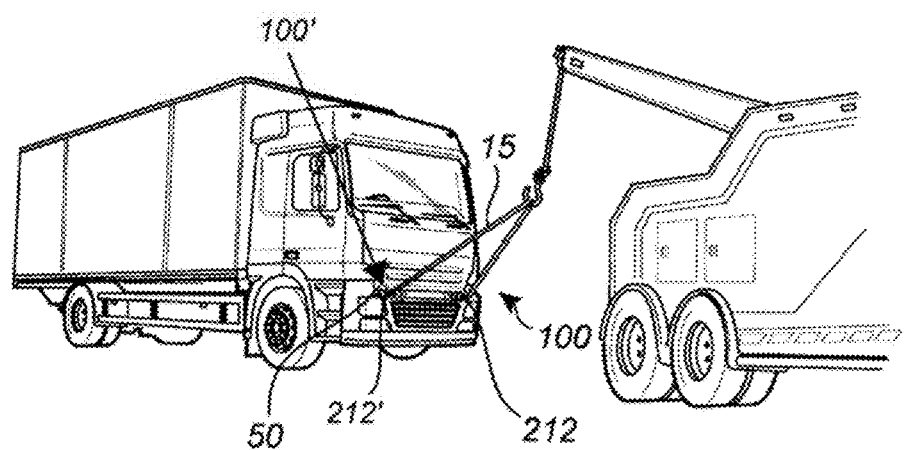
FIG. 6 is a schematic perspective view of an attachment arrangement which is used for salvaging work like towing or lifting of a truck.

With reference to FIGS. 1 to 3 and 6, an attachment system 99, for attaching an external component to a chassis of a vehicle according to the invention includes at least one attachment device 100, 100' which is designed to provide a rigid connection with the chassis and to provide a connection element 140, 140' arranged for connecting the external component to the chassis. In FIG. 1, the shown attachment system 99 has two attachment devices 100, 100' which are interconnected by means of a cross-bar 211 which in mounted position on a vehicle is arranged to extend horizontally and is adapted to be secured to the respective connection elements 140, 140' of the attachment devices 100, 100'. In the shown embodiment, in its outer end portions the crossbar 211 is provided with a respective opening 213 fitted to be slipped onto a connection element 140 which may be cylinder-shaped as in this exemplifying embodiment, and (optionally) to bear against a support lug 143, see e.g. FIG. 2, of the respective connection elements 140. Typically, the cross-bar is adapted to cover a spacing portion 142 of the connection element 140, such that a threaded portion 141 of the connection element 140 protrudes and can be accessed by connector elements 212, 212' which are screwed onto the respective threaded portions 141 of the connection elements 140 to fixate the crossbar 211. In this embodiment the crossbar is detachably arranged. The connector elements 212, 212' are here two, outwards protruding loop shaped elements which are positioned on the crossbar 211 with a mutual distance adapted to fit, as shown in FIG. 6, corresponding connecting elements of an external component such as e.g. towing chains 15 or a lifting beam. To continue with the exemplifying embodiment of FIGS. 1-3 and 6, the crossbar 211 further comprises second connector elements 214, 214', which may be adapted to receive a second type of salvaging device. The second salvaging device may be e.g. towing chains 15 or a lifting beam, which is a typical salvaging device used for towing/hauling of vehicles. Other types of connector elements are conceivable within the present inventive concept and are typically adapted to fit the type of external component to attach.

Figure 2:
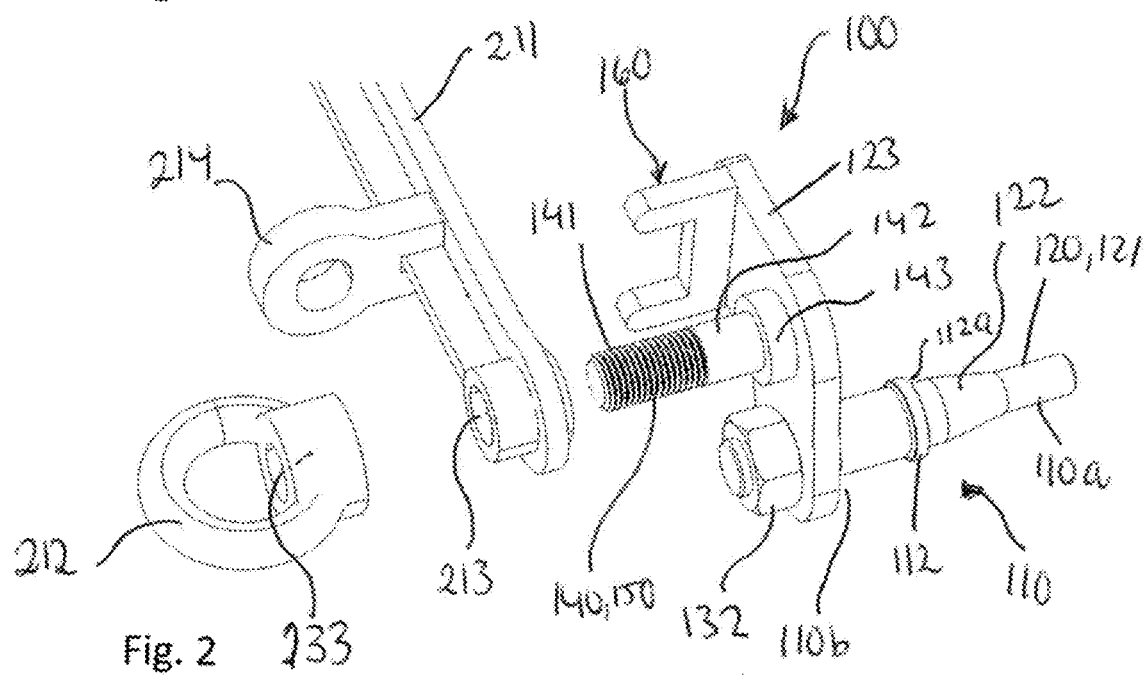
FIG. 2 is an exploded schematic perspective side close up view of a detail of the embodiment of the attachment system shown in FIG. 1.

In the exemplifying embodiment described with reference to FIGS. 1-3, the connection element 140 is cylinder shaped and fixated to a support plate 123 at a position which is eccentric with respect to the long axis of a chassis coupler element 110 which is used to connect the attachment device 100 to the chassis of the vehicle. The shown chassis coupler element 110, is a pull stud comprising a longitudinally elongated, substantially cylinder-shaped body, which is manufactured from heavy duty metal material such as toughened steel. The pull stud comprises a first fastening element 120 arranged at a first end portion 110a of the pull stud. The first fastening element 120 is arranged for providing a rigid connection with a corresponding connection means in a chassis frame to which the attachment device is connected during mounting. A corresponding connection means of the vehicle is herein after referred to as "chassis connector element". In accordance with the embodiment shown in FIG. 1, the first fastening element 120 is adapted to be connectable to a chassis connector element of e.g. a Volvo-truck. The pull studs first fastening element comprises a cylindrical end portion 121 with an outer threading, the cylindrical end portion having a first diameter, and a conical guiding portion 122 arranged immediately at and inside of the end portion 121. The guiding portion 122 has a base diameter which is larger than the end portion 121 first diameter. In alternative embodiments the first fastening element of the pull stud is adapted for fitting to a desired chassis connection element, i.e. the type of chassis connection element that a selected vehicle is equipped with. The pull stud 110 further comprises a support element 112 which is arranged on an inner position (more central position) with respect to the first fastening element 120, which support element consist of a protruding portion which is arranged having a larger diameter than the guiding portion base diameter. The support element 112 is arranged such that a bearing surface 112a of the support element bears against the chassis frame of the vehicle in a mounted position of the pull stud, when the first fastening element is screwed in place in a receiving chassis connection element. In a second end portion 110b of the pull stud, at the opposite end with respect to the first end portion 110a, a tightening nut 132, here in the form of a hexagonal nut, is arranged. The tightening nut 132 is intended for application of a torque wrench or the like, which is used to fasten the pull stud 110 to the chassis connector element and to provide follow-up draft on the joint which is formed between the first fastening element 120 and the chassis connector element when mounting the pull stud.

In the exemplifying embodiment, the external component is a salvaging means, such as a towing belt arranged for interconnection with a towing hook. The connector element 212 here comprises a hook (or eye), and further comprises an opening 133 arranged in the hook and having an inner threading, which provides a locking element when connecting the hook to the connection element 140 via a threaded portion 141 arranged at the free end of the connection element which is threaded on the outside.

The long axis of the connection element 140 extends parallel to the long axis of the chassis coupler element 110. Optionally the connection element 140 is provided with a spacing portion 142 arranged in a center position, and a cylinder-shaped support lug 143 arranged directly on the support plate 123. The support lug 143, which is optional and/or may have other shapes, has a function of providing a support and stop (at an inner position) for a connection element of the external component or a further part of the attachment system, e.g. the crossbar described above. Preferably the height of the support lug 143 matches the height of the nut 132 to ensure access to the nut head. Other connector elements and combinations of connection elements and connector elements and are applicable and considered to fall within the scope of the invention.

In the exemplifying embodiment, the connection element 140 for enabling interconnection of the attachment device 100 with the external component, based on the connection element 140 connecting with the connector element 212 that further connects with the external component, and the cross-bar fastening element 150 for fastening the cross-bar 211 to the attachment device 100 are a same element having both functions, such that the connection element 140 is configured to both enable interconnection of the attachment device 100 with the external component and to fasten the cross-bar 211 to the attachment device 100. It is conceivable within the present inventive concept to separate these functions, e.g. by attaching the cross-bar to a cross-bar fastening element on the attachment device while providing a connection element for attaching the external element onto the cross-bar such as the shown example with the second connector elements 214 or as a separate connection on the attachment device (not shown).

Figure 3:
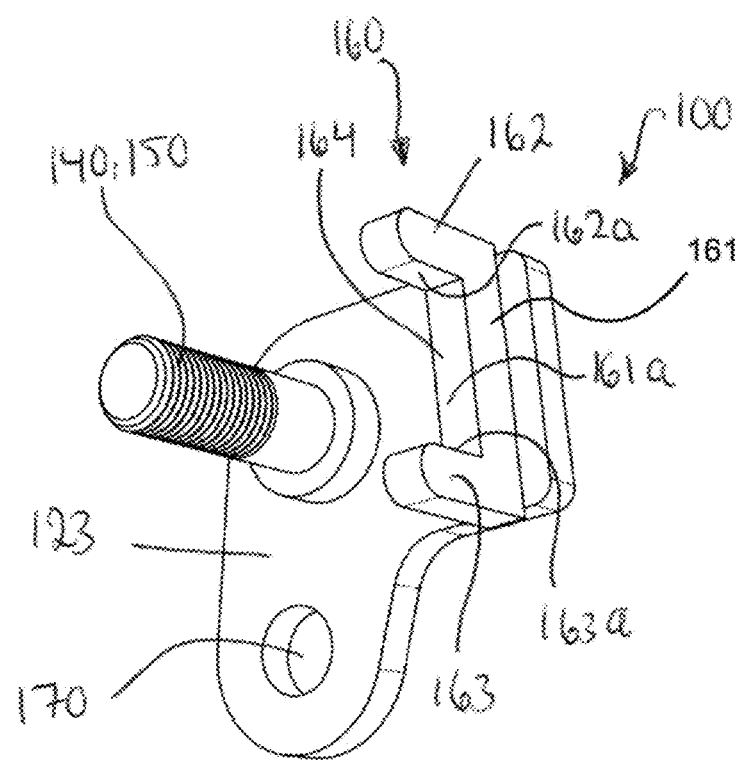
FIG. 3 is schematic perspective view of an embodiment of an attachment device according to the invention.

To continue with respect to FIG. 3, the attachment device 100 comprises a support plate 123 forming a base for the connection element 140, the cross-bar fastening element 150 and a chassis fixation element (here more specifically, the support plate 123 is arranged to receive the chassis coupler element 110 when attaching the attachment device to the chassis by means of a chassis coupler element opening 170). Further, a cross-bar support element 160 is arranged on the support plate, which is arranged to support the cross-bar 211 when fixated to the cross-bar fastening element 150 of the attachment device 100. The cross-bar support element 160 is here exemplified by a, with respect to the support plate 123, perpendicularly protruding portion 161 in which a C-shaped channel, herein referred to as recess 164, is defined by two protruding flanges, 162 and 163, and a bearing surface 161a onto which a corresponding contact area of the cross-bar 211 rests when mounted. The recess 164 is preferably formed to provide a clearance fit for a received portion of the cross-bar such that the respective inner surfaces 162a and 163a of the flanges 162 and 163, and the bearing surface 161a bear against corresponding (top, bottom and back side) contact areas of the cross-bar and provide support in a vertical direction. In the shown embodiment, the recess 164 is accessible from substantially a front direction with respect to the chassis when the attachment device is mounted to the chassis, and the shape of the recess is adapted to receive a portion of the cross-bar which is substantially plate shaped. In alternative embodiments, the cross-bar support element is provided as a protruding portion defining a receiving opening adapted for other types (or shapes) of cross-bars and to which also other types of cross-bar fastening element are conceivable, e.g. other shapes of the recess or opening are conceivable, other access directions are conceivable (e.g. a U-shaped recess where the cross-bar is received from the top) etc.

Continuing now with reference to FIG. 3, the support plate 123 is substantially L-shaped to allow the positioning of the cross-bar support element 160 and the cross-bar fastening element 150 to have a predetermined inter distance along the long axis of the crossbar when mounted to optimize the mechanical support to the crossbar. Both the cross-bar support element 160 and the cross-bar fastening element 150 are thus eccentrically positioned, or off-center positioned, with respect to the normal of the chassis fixation element (long axis of the chassis coupler element) which is of importance for stabilizing the attachment device when the cross-bar is mounted to the attachment device as about a chassis fixation point defined by the normal of the chassis fixation element is subjected to torsional forces during salvaging such that the attachment device may otherwise be rotated about the chassis fixation point. In addition, the attachment to the chassis, via the chassis coupler element may be arranged off-center with the connection element 140 and/or cross-bar fastening element 150 for the support element to be accessible.

Referring now to FIGS. 4 and 5, as mentioned previously, the present inventive concept is applicable with different types of chassis coupler elements of which a non-exhaustive number of examples are given herein.

Figure 4A:
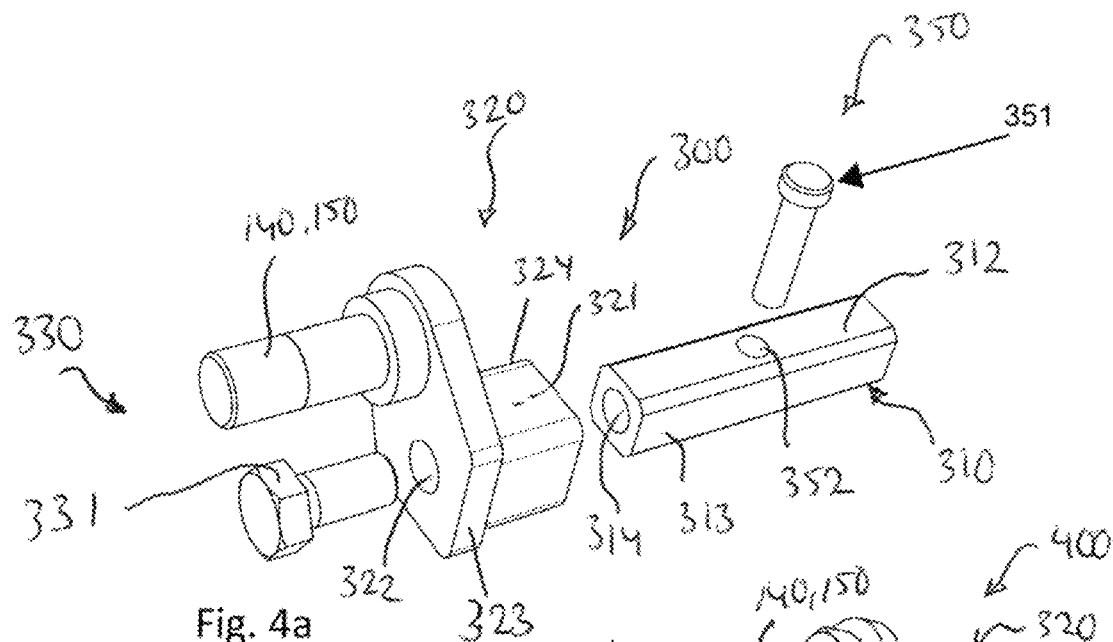
FIGS. 4a and 4b are perspective side views of an attachment device including a clamping device 330 with a distance element in the form of a collar shaped portion and chassis coupler element which is inserted in the collar shaped portion when mounted, with and without the cross-bar support element, that is
Figure 4B:
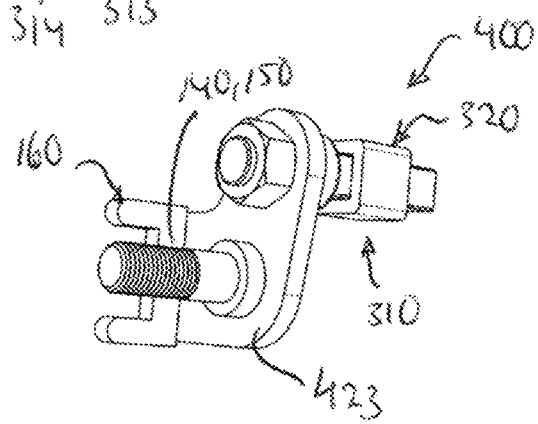
Figure 4C:
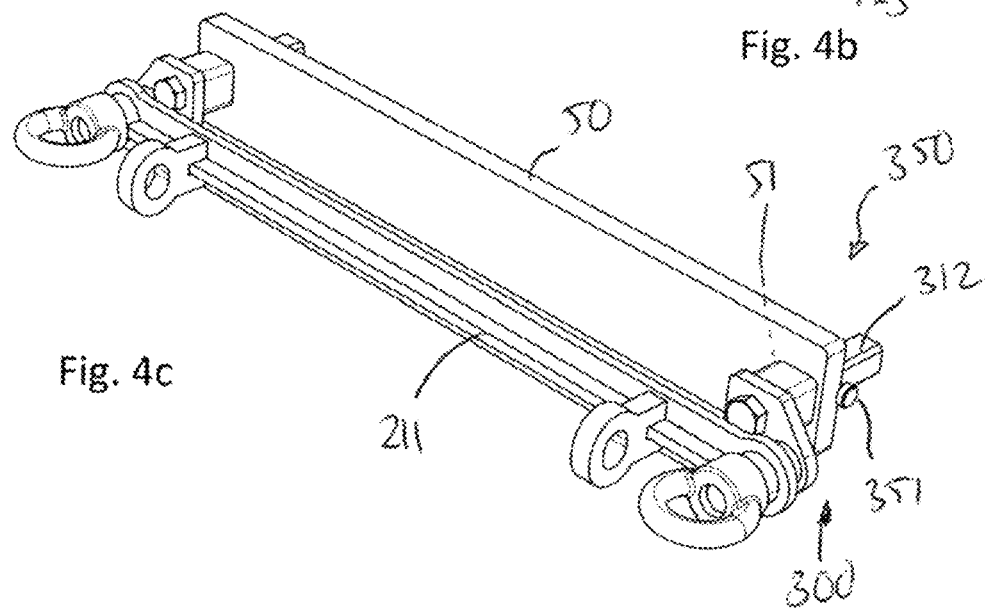
FIG. 4c is an illustration of an attachment system comprising attachment devices including such clamping devices and chassis coupler elements which are fastened to a chassis by means of a retainer pin.

FIGS. 4a and 4b are perspective side views of an attachment device 300 and 400, respectively, including a clamping device 330 with a distance element 320 in the form of collar shaped portion 324 and chassis coupler element 310 which is inserted in the collar shaped portion when mounted, with and without the cross-bar support element 160 as previously described with reference to FIG. 3, and FIG. 4c is an illustration of an attachment system comprising attachment devices including such clamping devices and chassis coupler elements which are fastened to a chassis by means of a retainer pin.

The shown attachment device 300 comprises a support plate 323 forming a base for the connection element 140 and the cross-bar fastening element 150, as previously described with reference to the embodiment shown in FIGS. 1-3. The attachment device 300 further comprises an elongated chassis coupler element 310 with a first end portion 312 and an opposite second end portion 313, and a fastening mechanism 350 for fastening the first end portion 312 of the chassis coupler element 310 to a chassis when in a mounted position. The attachment device 300 further comprises a distance element 320 which has a substantially collar shaped portion 324 with a hollow space 321 which is open in a direction facing the chassis and adapted to receive the second end portion 313 of the chassis coupler element 310 when in a mounted position. That is, the cross section of the hollow space 321 and the cross section of the second end portion 313 of the chassis coupler element 310 preferably match with a clearance fit. The support plate 323 closes the hollow space 321 in a direction not facing the chassis when in a mounted position, and a clamping mechanism 330 which may be implemented by means of a bolt screw 331 inserted through an opening 322 and engaging with an inner threaded centered opening 314 arranged in the second end portion 313 of the chassis coupler element 310. Other clamping mechanisms which controls the insertion length of the chassis coupler element end portion into the collar shaped portion of the distance element are conceivable.

Referring now to FIG. 4c two attachment devices 300 are shown mounted to a chassis 50, the first end portion 312 is inserted in a receiving mounting opening 51 of the chassis 50 and locked in position with the fastening mechanism 350 here arranged with a retainer pin 351 and a complementary anchor opening 352 arranged in the first end portion 312 of the chassis coupler element 310. At least a portion of the first end portion 312 of the attachment device is shaped to fit in the corresponding mounting opening 51 of the chassis 50, preferably in a clearance fit. When the system is mounted, clamping of the attachment device 300 and chassis 50 is provided by after securing the first end portion 312 to the chassis 50, the distance element 320 is put over the second end portion 313 and the bolt 331 is inserted through the support plate opening 322 to engage with the threaded opening 314 of the second end portion 313 and tightened. An embodiment of the attachment device 400 of the present inventive concept as illustrated in FIG. 4b is illustrated partly cut open to demonstrate the present inventive concept applied together with utilizing the clamping mechanism described with reference to FIGS. 4a and 4c. The attachment device 400 comprises a support plate 423 forming a base for the connection element 140, the cross-bar fastening element 150, and the cross-bar support element 160, as previously described with reference to the embodiment shown in FIGS. 1-3. The attachment device 400 further comprises the elongated chassis coupler element 310 and clamping element as described with reference to FIGS. 4a and 4c. According to embodiments of the attachment system, the shape of the first end portion and in the same manner the second end portion of the chassis coupler element may be selected from a variety of shapes. The shapes of (cross-sections of) first and second end portions, 312 and 313, are selected to be received by the mounting opening 51 of the chassis and the hollow space 321, respectively, in a clearance fit. The shapes of (cross-sections of) the first end portion 312, the second end portion 313, the mounting opening 51 and the hollow space 321 are here selected to be an irregular octagon (square with cut corners), which is advantageous as the formed rigid connection is sturdy and highly reduces the risk of the attachment device rotating about its long axis even when the attachment device is subjected to heavy asymmetrical loads as may be the case when e.g. salvaging a tilted heavy duty vehicle from a ditch.

Figure 5A:
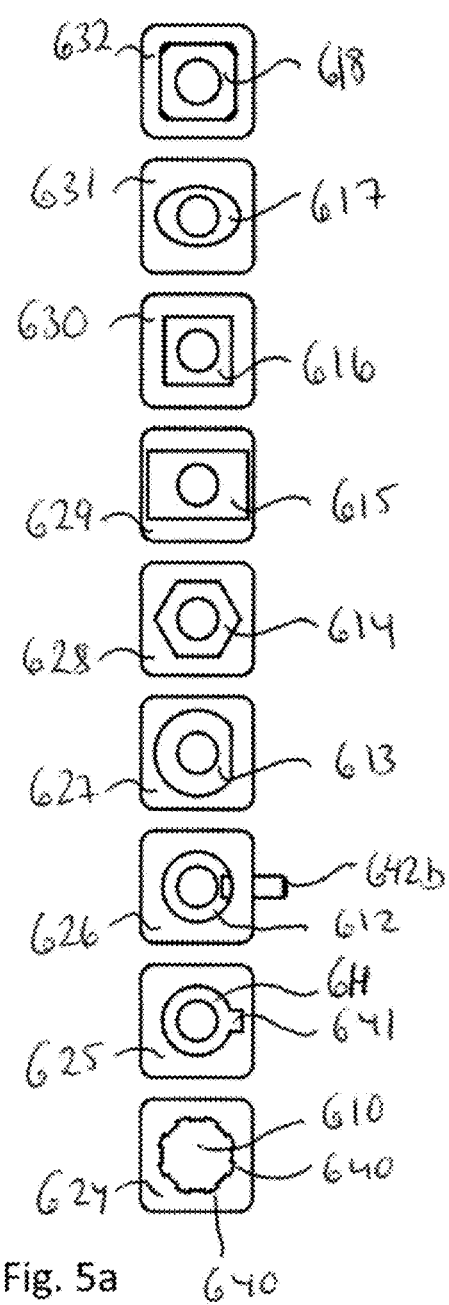
FIG. 5a shows schematic top views of cut open illustrations of various different chassis coupler elements and collar shaped portions according to the present inventive concept.
Figure 5B:
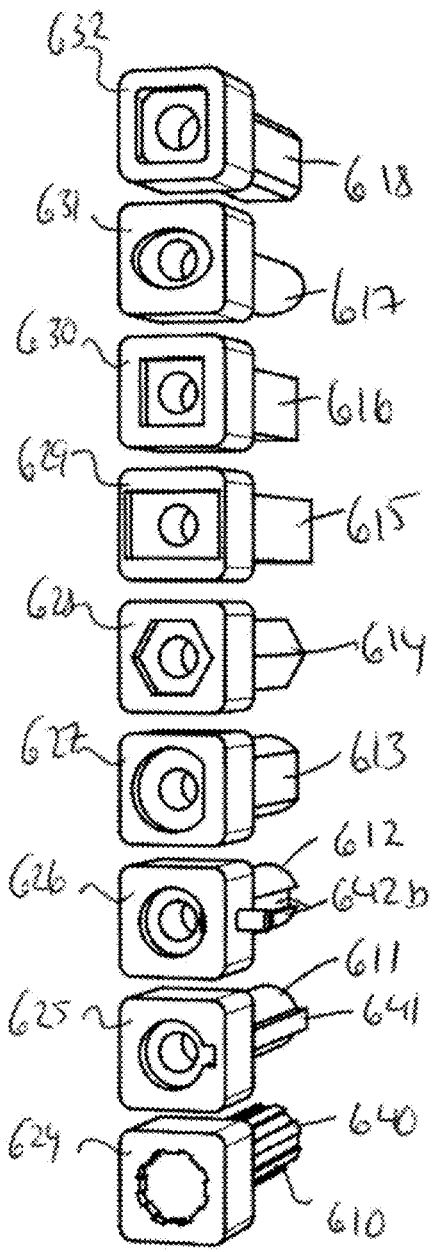

It is advantageous to select a cross-section shape that contains at least one portion that separates the cross-section shape from a circle and thus prevents a rotation of the parts of the attachment device about the long axis of the chassis coupler element, which is illustrated in FIG. 5a, which shows top views of cut open illustrations of various different chassis coupler elements 610-618 and collar shaped portions 624-632 according to the present inventive concept, and FIG. 5b which shows perspective side views of cut open illustrations of the same various different chassis coupler elements 610-618 and collar shaped portions 624-632 according to the present inventive concept as shown in FIG. 5a. Note that each illustrated chassis coupler element 610-618 and corresponding receiving openings (hollow space) of the appertaining collar portion 624-632, respectively, have cross-sections which are non-circular, i.e. separates from being circular, like a regular or irregular polygon etc.

The invention claimed is:

1. An attachment device for attaching an external component to a chassis of a vehicle, the attachment device including:
   a support plate onto which a connection element for enabling interconnection with the external component is attached, the support plate forming a base of the connection element,
   a chassis coupler element configured to fixate the attachment device to the chassis such that a long axis of the connection element extends parallel to a long axis of the chassis coupler element,
   said connection element configured to fasten a cross-bar to the attachment device, and
   a cross-bar support element attached to the support plate, the cross-bar support element arranged on the support plate to support the cross-bar when the cross-bar is fixated to the connection element,
   wherein the support plate is substantially L-shaped such that both the cross-bar support element and the connection element are eccentrically positioned on the support plate with respect to the long axis of the chassis coupler element.

2. The attachment device of claim 1, wherein the cross-bar support element includes a recess arranged to receive at least a portion of the cross-bar.

3. The attachment device of claim 2, wherein at least a portion of the recess is shaped to provide a clearance fit for at least a predetermined portion of the cross-bar.

4. The attachment device of claim 2, wherein the recess is accessible from substantially a front direction with respect to the chassis when the attachment device is mounted to the chassis.

5. The attachment device of claim 2, wherein the cross-bar support element is positioned off center with respect to the long axis of the chassis coupler element.

6. The attachment device of claim 1, wherein the cross-bar support element is distanced from the connection element.

7. The attachment device of claim 1, wherein the chassis coupler element includes a fastening mechanism for fastening a first end portion of the chassis coupler element to the chassis when in a mounted position, and a second end portion of the chassis coupler element connected to the support plate.

8. The attachment device of claim 7, wherein a cross-section of at least a portion of the chassis coupler element is selected to prevent rotation of the chassis coupler element about the long axis of the chassis coupler element when mounted to the chassis.

9. The attachment device of claim 7, wherein the fastening mechanism comprises a retainer pin and the chassis coupler element comprises an anchor opening for the retainer pin.

10. The attachment device of claim 7, wherein the fastening mechanism includes a threaded portion for connecting to a corresponding threaded portion inside a mounting opening of the chassis.

11. The attachment device of claim 7, wherein the fastening mechanism comprises a key portion arranged on the first end portion.

12. A system, comprising:
   the attachment device of claim 1; and an external component attached to the attachment device, wherein the external component is a salvaging device.

13. An attachment system for attaching an external component to a chassis of a vehicle, the attachment system including two attachment devices according to claim 1.

14. The attachment system of claim 13, further comprising a horizontally elongated cross-bar which is arranged for interconnecting the two attachment devices.

15. The attachment system of claim 14, wherein the cross-bar is detachably arranged.

16. The attachment system of claim 14, wherein
the cross-bar is configured to interconnect the two attachment devices,
the two attachment devices each have a respective said cross-bar support element and a respective said connection element that are distanced from each other along a long axis of the cross-bar, and the two attachment devices are arranged to be mirror-inverted such that in a mounted position, the respective cross-bar support elements of the two attachment devices face each other or point away from each other with respect to the long axis of the cross-bar.

* * * * *